US012594642B2

(12) United States Patent
Schneider et al.

(10) Patent No.: US 12,594,642 B2
(45) Date of Patent: Apr. 7, 2026

(54) BLOCK PIECE FOR BLOCKING A LENS

(71) Applicant: SCHNEIDER GMBH & CO. KG, Fronhausen (DE)

(72) Inventors: Gunter Schneider, Marburg (DE); Stephan Huttenhuis, Niederweimar (DE); Thomas Simmer, Biedenkopf-Breidenstein (DE)

(73) Assignee: SCHNEIDER GMBH & CO. KG, Fronhausen (DE)

( * ) Notice: Subject to any disclaimer, the term of this patent is extended or adjusted under 35 U.S.C. 154(b) by 1361 days.

(21) Appl. No.: 16/488,423

(22) PCT Filed: Feb. 19, 2018

(86) PCT No.: PCT/EP2018/054040
§ 371 (c)(1),
(2) Date: Oct. 31, 2019

(87) PCT Pub. No.: WO2018/153816
PCT Pub. Date: Aug. 30, 2018

(65) Prior Publication Data
US 2020/0171616 A1 Jun. 4, 2020

(30) Foreign Application Priority Data

Feb. 24, 2017 (DE) ..................... 10 2017 001 792.1

(51) Int. Cl.
*B24B 13/005* (2006.01)
*B24B 9/14* (2006.01)
(Continued)

(52) U.S. Cl.
CPC ............ *B24B 13/005* (2013.01); *B24B 9/146* (2013.01); *B24B 13/00* (2013.01); *B29D 11/00942* (2013.01)

(58) Field of Classification Search
CPC .... B24B 13/005–0057; B24B 13/0006; B24B 13/0012; B24B 13/0018; B24B 13/0025;
(Continued)

(56) References Cited

U.S. PATENT DOCUMENTS 2,441,472 A * 5/1948 Avaucourt ............ B24B 13/005
451/384
3,886,696 A 6/1975 Bruck
(Continued)

FOREIGN PATENT DOCUMENTS

DE 2621891 A1 12/1977
DE 102004021696 A1 11/2005
(Continued)

OTHER PUBLICATIONS

NPL1, Merriam Webster definition of proof (adj); Available Mar. 28, 2016; https://www.merriam-webster.com/dictionary/proof (Year: 2016).*
(Continued)

*Primary Examiner* — Michael A Gump
(74) *Attorney, Agent, or Firm* — Calderon Safran & Wright P.C.

(57) ABSTRACT

A block piece (1) for blocking a lens (2), in particular an eyeglass lens, by means of a block material (3), wherein the block piece (1) has a bottom part (4) for holding the block piece (1) and an upper part (5) for a fastening of the lens (2) for processing and/or coating of an optically active surface of the lens (2). Additionally, the block piece (1) is used in a method for blocking a lens (2), in particular an eyeglass lens, and the bottom part (4) and multiple upper parts (5) for blocking a lens (2) provided as part of a kit.

25 Claims, 5 Drawing Sheets

(51) Int. Cl.
  *B24B 13/00* (2006.01)
  *B29D 11/00* (2006.01)
(58) Field of Classification Search
  CPC . B24B 13/0052; B24B 13/0055; B24B 9/146;
    B24B 9/14; B29D 11/00942
  USPC ... 451/42, 43, 240, 255, 256, 277, 384, 390,
    451/398, 460, 921
  See application file for complete search history.

(56) References Cited

U.S. PATENT DOCUMENTS

| | | | | |
|---|---|---|---|---|
| 5,150,547 | A * | 9/1992 | Johnson | B24B 13/005 |
| | | | | 451/390 |
| 5,408,792 | A | 4/1995 | Gottschald | |
| 5,454,748 | A | 10/1995 | Gottschald | |
| 5,754,269 | A | 5/1998 | Benjamin et al. | |
| 5,763,075 | A | 6/1998 | Benjamin et al. | |
| 5,885,700 | A | 3/1999 | Weldon et al. | |
| 6,110,017 | A | 8/2000 | Savoie et al. | |
| 6,632,080 | B1 | 10/2003 | Kok et al. | |
| 6,641,466 | B2 | 11/2003 | Wallendorf et al. | |
| 6,902,468 | B2 | 6/2005 | Luderich et al. | |
| 7,779,778 | B2 | 8/2010 | Igarashi et al. | |
| 8,460,069 | B2 | 6/2013 | Annaka | |
| 8,616,150 | B2 | 12/2013 | Savoie et al. | |
| 8,870,628 | B2 | 10/2014 | Schafer et al. | |
| 9,340,669 | B2 * | 5/2016 | Schneider | C08L 67/02 |
| 9,694,465 | B2 | 7/2017 | Schneider et al. | |
| 9,862,087 | B2 | 1/2018 | Schneider et al. | |
| 9,969,051 | B2 | 5/2018 | Lafon et al. | |
| 10,118,271 | B2 | 11/2018 | Huber | |
| 2002/0149862 | A1 * | 10/2002 | Wallendorf | B24B 9/146 |
| | | | | 359/811 |
| 2003/0214058 | A1 | 11/2003 | Belly et al. | |
| 2008/0055542 | A1 | 3/2008 | Haddadi | |

| | | | | |
|---|---|---|---|---|
| 2010/0170635 | A1 | 7/2010 | Savoie | |
| 2010/0297919 | A1 | 11/2010 | Freson et al. | |
| 2011/0067628 | A1 | 3/2011 | Savoie et al. | |
| 2013/0072088 | A1 * | 3/2013 | Schneider | B23Q 17/007 |
| | | | | 451/442 |
| 2013/0270759 | A1 | 10/2013 | Schneider et al. | |
| 2013/0273815 | A1 * | 10/2013 | Schneider | B24B 13/0055 |
| | | | | 451/8 |
| 2013/0303060 | A1 * | 11/2013 | Schneider | B24B 13/005 |
| | | | | 451/390 |
| 2014/0315472 | A1 * | 10/2014 | Schneider | B24B 47/22 |
| | | | | 156/64 |
| 2014/0329443 | A1 * | 11/2014 | Savoie | B24B 9/146 |
| | | | | 451/390 |
| 2015/0138501 | A1 | 5/2015 | Baudert et al. | |
| 2016/0325394 | A1 * | 11/2016 | Monaghan | B24B 13/0052 |
| 2016/0375540 | A1 * | 12/2016 | Huber | B24B 13/005 |
| | | | | 451/28 |
| 2017/0239774 | A1 | 8/2017 | Cormier et al. | |
| 2017/0348823 | A1 | 12/2017 | Gerrath et al. | |

FOREIGN PATENT DOCUMENTS

| | | | | |
|---|---|---|---|---|
| JP | | 2010284729 A | 12/2010 | |
| WO | | 2010110271 A1 | 9/2010 | |
| WO | | WO-2016001575 A1 * | 1/2016 | B24B 13/0055 |

OTHER PUBLICATIONS

Satisloh AG: "Layoutblocker—PRA High-production alloy-blocking with optical recognition", Brochure, Apr. 30, 2012, pp. 1-2, http://www.satisloh.com/uploads/media/Info_LayoutblockerPRA_en.pdf, Switzerland.
Office Action in U.S. Appl. No. 16/488,442 dated Dec. 19, 2023, 43 pages.

* cited by examiner

BLOCK PIECE FOR BLOCKING A LENS

BACKGROUND OF THE INVENTION

Field of the Invention

The invention relates to a block piece for blocking an eyeglass lens by means of a block material, wherein the block piece has a bottom part for holding the block piece and an upper part for a fastening of the lens for processing and/or coating an optically active surface of the lens. In addition, the invention relates to a kit having a bottom part and multiple upper parts for blocking a lens with a blocking material and a method of using a block piece for blocking an eyeglass lens wherein a block piece is provided which has a bottom part, on which the block piece can be held, and an upper part for a fastening of the lens for processing and/or coating of an optically active surface of the lens.

Lenses, in particular optical lenses, quite especially eyeglass lenses, are blocked for (additional) processing and/or (additional) coating usually on a so-called block piece as a holder by means of a so-called block material, i.e., connected in a positive, bonded and/or non-positive manner with the block piece with a side that is finished or still to be processed and thus fastened to the block piece. The block piece is used in particular to hold the lens that is fastened thereto—i.e., blocked—in a precise and defined manner for one or more processing tasks and/or coatings. The block piece-lens pair that results with the blocking can be held in a processing machine and/or coating unit on the block piece.

In particular, a blocked eyeglass lens can be machined on its rear and/or front surface with respect to its optical action and/or on the edge for integration into an assigned eyeglass frame with geometrically defined (milling/turning) or geometrically undefined (grinding/polishing) cutting edge and/or can be coated on its rear and/or front surface for achieving additional effects (increase in scratch resistance, antireflection properties, mirroring, hydrophobic properties, etc.). Such an eyeglass lens can be processed and/or coated as early as before the blocking on one or both optically active surfaces and/or on the edge.

Eyeglass lenses are defined as optical lenses or lens blanks (blanks) for eyeglasses that consist of commonly used transparent materials, such as plastic (e.g., polycarbonate, CR-39, Hi-index) or mineral glass, and with any (preliminary) shape of the peripheral edge of the lens and/or the lens blank. On the surface on which they are blocked, such eyeglass lenses can be provided with a film, a lacquer or the like in order to protect this surface from contamination and damage and/or to improve the adhesion properties between eyeglass lens and block material.

Below, the term "lens" is used both for a lens that was processed and/or coated in advance on one side (rear or front surface) and in which the other side is still to be processed and/or coated, and for a lens that is still to be processed and/or coated on both sides.

As block material, metal alloys with low melting points (e.g., an alloy) or thermoplastics, i.e., thermoplastic materials, or non-thermoplastic materials, in particular hardening adhesives (e.g., light-curing glues), but also adhesive tapes or the like can be used. Depending on the block material that is used, various requirements or process sequences result during blocking.

Description of Related Art

A block piece for blocking an eyeglass lens blank is known from German Patent Application DE 10 2014 003

539 A1 and corresponding U.S. Pat. No. 10,118,271 B2. The eyeglass lens blank has a finished surface and a processing surface that is opposite to the finished surface for processing in a processing device. The known block piece has a bottom part for holding the block piece in a subsequent processing in the processing device and an in particular separate upper part for a fastening of the eyeglass lens blank. The upper part has a convex, flat, or concave block surface for blocking the finished surface of the eyeglass lens blank.

The known upper part has an essentially even mating surface, which is arranged opposite to the block surface. The normal of the mating surface is inclined by 10 to $10^0$ relative to the normal at the midpoint of the block surface. The known bottom part has an essentially even and inclined support surface, on which the upper part can be supported with its mating surface. The support surface is inclined in a processing position so that the normal of the support surface is inclined by 1° to 10° relative to a predetermined processing axis of the bottom part.

The known upper part and the bottom part are designed to rotate opposite one another so that the normal is arranged parallel or inclined at the midpoint of the block surface relative to the processing axis of the bottom part. The magnitude of the inclination is dependent upon the relative turning position of the upper part to the bottom part.

SUMMARY OF THE INVENTION

The focus of this invention is the blocking of a lens without support rings. In this case, the lens and/or a side of the lens is connected directly to a block piece that is provided with block material and/or is blocked thereon.

In addition, an object of this invention is the blocking of a lens, in which an exclusively bonded connection between the lens and precisely one block piece is produced by means of a block material. A block piece-lens pair with precisely one lens and precisely one block piece results from this blocking. This blocking ensures that the resulting block piece-lens pair can be held in a processing machine and/or coating unit on the block piece, and an optically active surface and/or a back and/or front surface of the lens can be processed and/or coated. An edge processing for adaptation to an eyeglass frame is thus not intended.

In comparison to the edge processing, the block piece-lens pair in the case of a surface processing must withstand higher forces and forces that act in other directions. In particular, the lens and the block piece must be connected to one another rigidly thus also in a torque-proof manner with respect to one another. The block piece must not be deformed and/or must not be deformable by the forces that are exerted in the surface processing on the lens. A block piece that is suitable for this blocking has a diameter that is larger than the diameter of the ultimately-generated utility surface of the lens.

On the bottom part of the block piece, the block piece-lens pair for processing and/or coating the lens can be held in a workpiece chuck, processing device and/or coating device, wherein the block piece-lens pair can be detached from the workpiece chuck.

For the (additional) processing and/or (additional) coating of a lens, for the consumption of block material, for the stability of the connection between lens and block piece, and for the reduction of shrinkage in the block material, it is advantageous to orient the lens as precisely as possible relative to the block piece. In this case, the term "to orient" is defined as the turning and/or tilting and/or rotating of the lens in space around three rotational axes and/or tilting axes and/or axes of rotation that are typically perpendicular to one another—frequently referred to as the A-, B- and/or C-axis—in a defined rotational position.

One object of this invention is to improve the known block piece with respect to the in particular automatic handling, the possible uses, the design and/or the costs.

It is self-explanatory that configurations, embodiments, advantages and the like, which are cited below only for one aspect of the invention for purposes of avoiding repetitions, correspondingly apply relative to the other aspects of the invention.

This being said, this invention is described in more detail below.

The block piece according to the invention has a bottom part for holding the block piece (e.g., in a workpiece chuck of a processing device or coating device) and a separate upper part for a fastening of a lens. The purpose statement "for holding the block piece" is in this case to be understood to mean that the bottom part has to be suitable for ensuring that the block piece can be held on the bottom part in the case of processing and/or coating.

A first, independent basic idea of the first aspect of the invention consists in that the bottom part and the upper part are connected to one another in a torque-proof manner with respect to one another, preferably plugged into one another in a torque-proof manner with respect to one another. With this embodiment, in particular rotations of the upper part relative to the bottom part cannot be performed in the peripheral direction. The bottom part and the upper part are preferably connected to one another in such a way that the position of the upper part relative to the bottom part remains unchanged during blocking, processing and/or coating of the lens.

The block piece according to the invention in accordance with the first basic idea makes it possible to block a lens on the block piece as well as to transport and to process a lens that is blocked on the block piece, without the position of the upper part changing relative to the bottom part.

A second, independent basic idea of the first aspect of the invention consists in that the bottom part is made of metal, in particular aluminum, and the upper part is made of plastic.

The block piece according to the invention in accordance with the second basic idea makes it possible to hold, in particular to clamp (e.g., in a workpiece chuck of a spindle of a processing machine), the block piece on the bottom part with no wear or at least little wear, whereas the upper part can be machined, in particular before the blocking and/or during the processing of the lens. The chip that is produced during the machining of the upper part can be easily and economically disposed of.

A third, independent basic idea of the first aspect of the invention consists in that the block piece has at least one marking or coding, which indicates a type of block piece.

The block piece according to the invention in accordance with the third basic idea makes it possible to identify the type of block piece manually and/or automatically. In this case, the term "type" refers to, e.g., a purpose, a state and/or a property of the block piece, such as, e.g., the diameter of a block surface of the block piece, the curvature of the block surface of the block piece, the prismatic tilting of the block surface of the block piece, and/or a degree of wear of the block piece.

Preferably, the upper part can be detached from the bottom part, in particular by application of force, quite especially by extrusion.

In the case of a preferred embodiment, the upper part has a block surface for the lens and/or the block material. The bottom part can be connected in particular in succession with various upper parts. The upper parts are different in this case with respect to the diameter of the block surface, the curvature of the block surface, and/or the prismatic tilting of the block surface. The upper part is exchangeable. Depending on requirements during blocking and/or processing and/or coating, a suitable upper part can optionally be connected to the bottom part in a detachable manner. Thus, e.g., an upper part can be selected, whose block surface corresponds as precisely as possible to the side (surface) of the lens that is to be blocked. In this way, a block material consumption as low as possible can be realized and/or undesirable effects such as shrinkage of the block material can be reduced and/or avoided.

The normal at the midpoint of the block surface of the respective upper part can be inclined relative to a central axis of the bottom part. This makes possible a prismatic blocking. Advantageously, any upper part can be plugged into the bottom part only in such a way that the normal at the midpoint of the block surface of the respective upper part and the central axis of the bottom part always span the same plane. In other words, it is possible to combine the upper part and bottom part so that the prism of the resulting block piece always runs in the same direction and/or has the same rotational position in the peripheral direction.

The upper part is preferably pressed into the bottom part, in particular in a rigid seat, preferably in a force fit and/or an interference fit (press fit).

It has proven advantageous when the upper part is connected positively to the bottom part in a torque-proof manner. In particular, the upper part and the bottom part are engaged axially and/or radially. Thus, for example, the bottom part can have a recess, and the upper part can have a pin that is complementary to the recess of the bottom part, so that the upper part can be plugged into the bottom part only in such a way that the pin of the upper part grips into the recess of the bottom part.

The torque-proof seat of the upper part in the bottom part can thus be produced by a force fit, a press fit and/or by positive fit. Preferably, force fit, and/or press fit and positive fit are combined, which increases the torque strength.

Preferably, the block piece and/or its bottom part has an undercut for positive axial holding and/or clamping. As a result, the support of the block piece in a seat for the block piece can be increased.

The upper part is preferably a plastic injection-molded part. This makes possible an economical production.

In the case of a preferred embodiment of the block piece according to the invention, the marking and/or coding is at least one characteristic and/or at least one protrusion and/or at least one recess and/or is provided on the upper part, in particular on the periphery of the upper part. This makes possible a simple identification of the type of block piece.

The marking and/or coding can be arranged and/or designed so that it remains permanently on the block piece or so that it can be machined in the case of processing of the lens.

Preferably, the block piece has two markings or codings, wherein the one marking and/or coding is arranged and/or designed so that it remains permanently on the block piece, and the other marking and/or coding is arranged and/or designed so that it can be machined in the case of processing of the lens. In particular, it can be determined manually and/or automatically from the other marking and/or coding whether the upper part is worn out or damaged and/or is to be exchanged, whereas in addition, the type of block piece can be identified by means of the one marking and/or coding.

Advantageously, the bottom part and/or the upper part has/have means, in particular a groove, for holding a blocked lens and/or a block piece-lens pair by means of a transport device.

This makes possible the transport of the block piece-lens pair without touching the lens by the transport device, in particular a suction device of the transport device. As a result, impairments of and/or damage to the lens, in particular a polished side of the lens, can be avoided.

The block piece according to the invention is suitable for an automatic and/or mechanical handling. In particular, it can be used in a partially-automated and fully-automated lens production process.

According to a second aspect of the invention, the previously-illustrated object is achieved by a use of a block piece, in particular a block piece as previously described, for blocking a lens, in particular an eyeglass lens, wherein the lens is blocked selectively on the upper part by means of an adhesive block material or on the bottom part by means of a metal alloy as block material or on an adapter that is attached to the bottom part by means of a metal alloy as block material.

The block piece has a bottom part for holding the block piece and an upper part for a fastening of the lens. According to the invention, it is provided that the lens optionally is blocked on the upper part by means of an adhesive block material or on the bottom part by means of a metal alloy as block material or on an adapter that is attached to the bottom part by means of a metal alloy as block material.

According to a third aspect of the invention, the previously-illustrated object is achieved by a kit having a bottom part and multiple upper parts for blocking an eyeglass lens, by means of a block material, wherein the upper part has a block surface for the lens and/or the block material, the upper parts are different with respect to the diameter of the block surface, the curvature of the block surface, and/or the prismatic tilting of the block surface, the bottom part can be connected in succession with respectively one of the upper parts to a block piece, and the respective block piece can be held on the bottom part for processing and/or coating an optically active surface of the lens.

The upper part has a block surface for the lens and/or the block material. The upper parts are different from one another with respect to the diameter of the block surface, the curvature of the block surface, and/or the prismatic tilting of the block surface. The bottom part can be connected in succession with respectively one of the upper parts to a block piece. The respective block piece can be held on the bottom part for processing and/or coating an optically active surface of the lens.

According to a fourth aspect of the invention, the previously-illustrated object is achieved by using a block piece, in particular a block piece as previously described, for blocking a lens, in particular an eyeglass lens, in which the block piece has a bottom part, on which the block piece can be held, and an upper part for a fastening of the lens for processing and/or coating an optically active surface of the lens. The lens is blocked on the upper part by means of a block material. An optically active surface of the blocked lens is processed and/or coated. The bottom part is made of metal, and the upper part is made of plastic. Alternatively or in addition, the bottom part and the upper part are connected to one another in a torque-proof manner.

Additional aspects, features, advantages, and properties of the present invention follow from the following description of preferred embodiments with reference to the accompanying drawings.

DETAILED DESCRIPTION OF THE INVENTION

In the figures, the same reference numbers are used for the same or similar components and systems, wherein the same or corresponding advantages and properties are produced, even when a repeated description is omitted.

Figure 1:
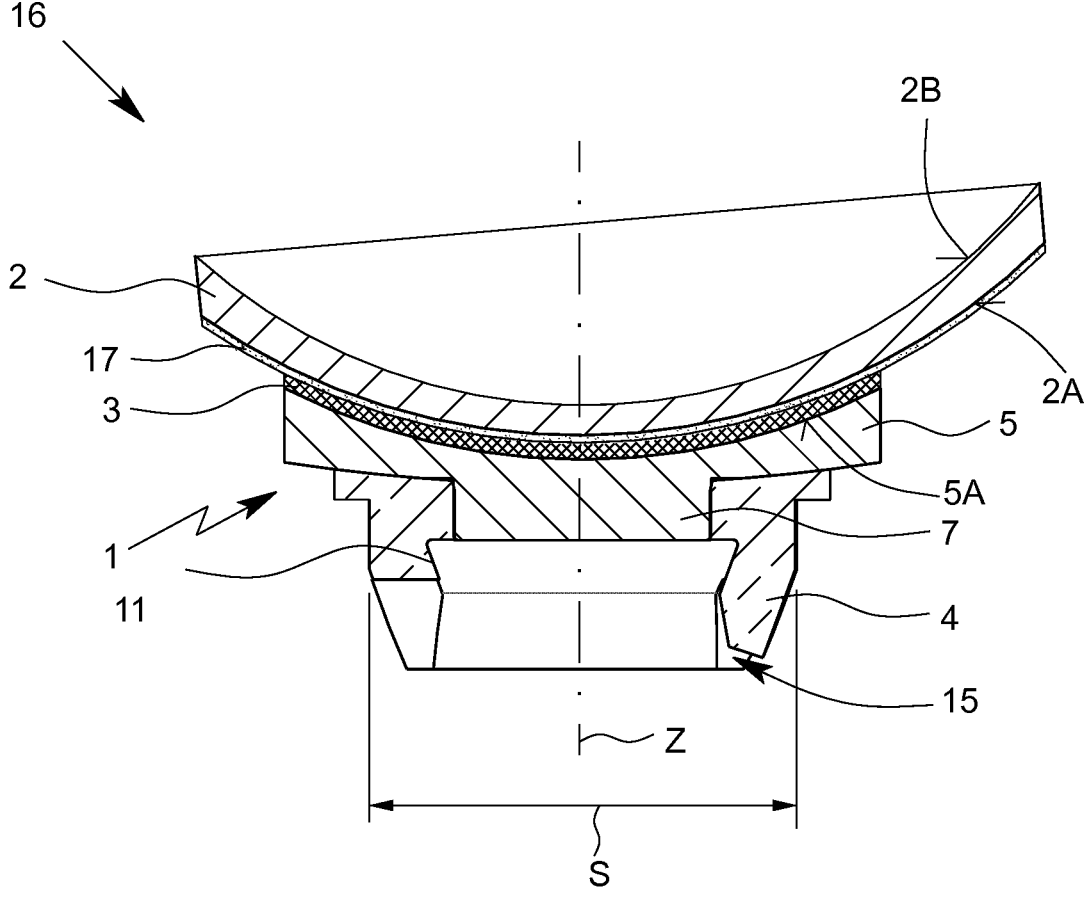
FIG. 1 is a sectional view through a preferred embodiment of a block piece according to the invention with a lens that is blocked thereon by means of a block material.
Figure 2:
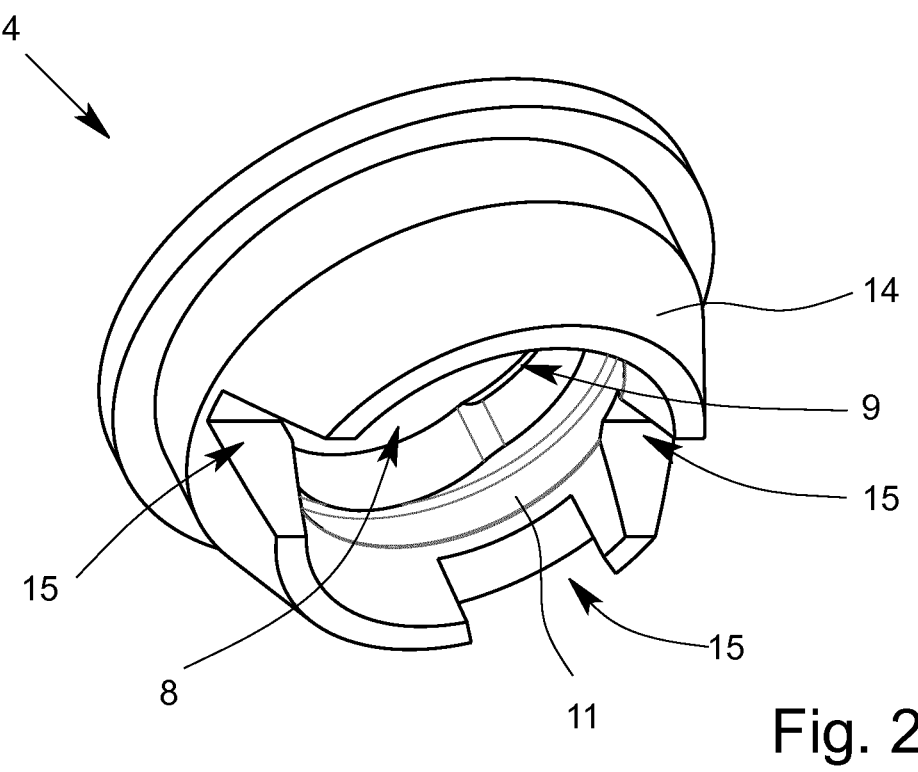
FIG. 2 is a perspective view of a bottom part of the block piece of FIG. 1.
Figure 3:
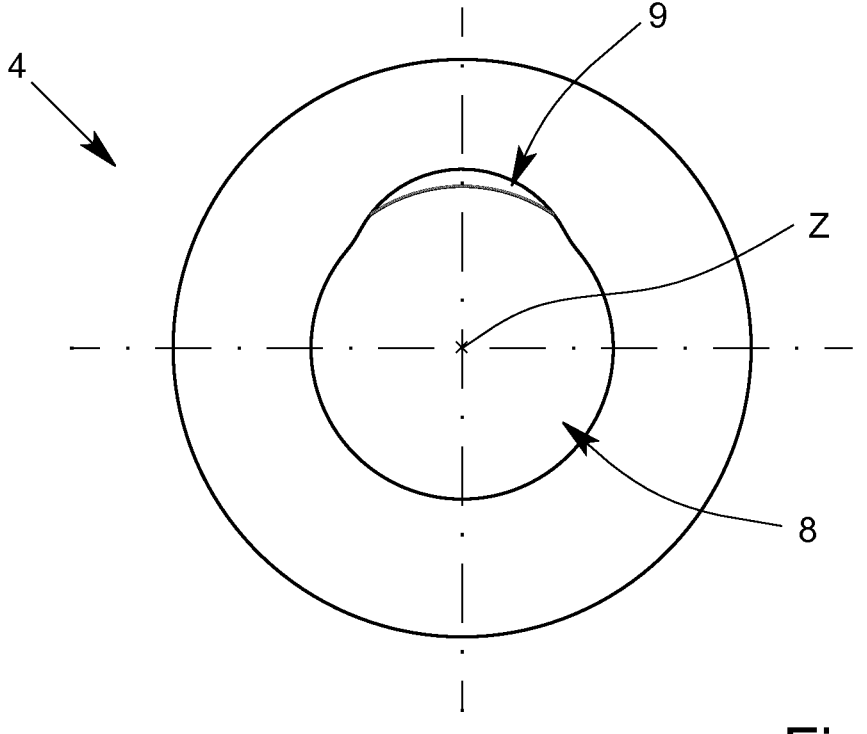
FIG. 3 is a top view of the bottom part of FIG. 2.
Figure 4:
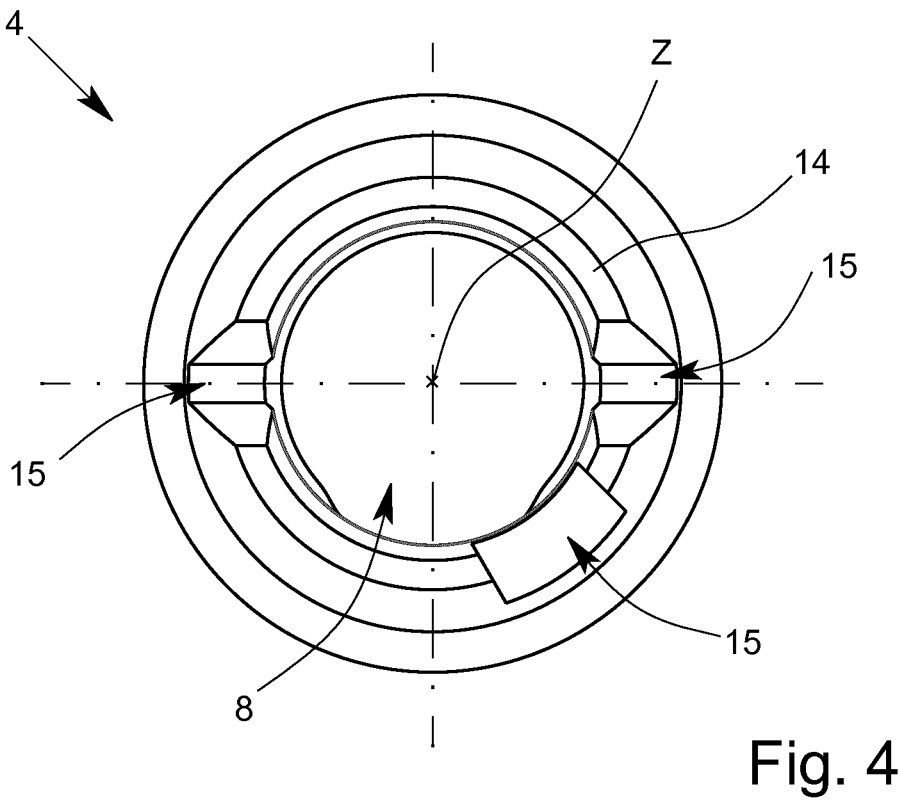
FIG. 4 is a bottom view of the bottom part of FIG. 2.
Figure 5:
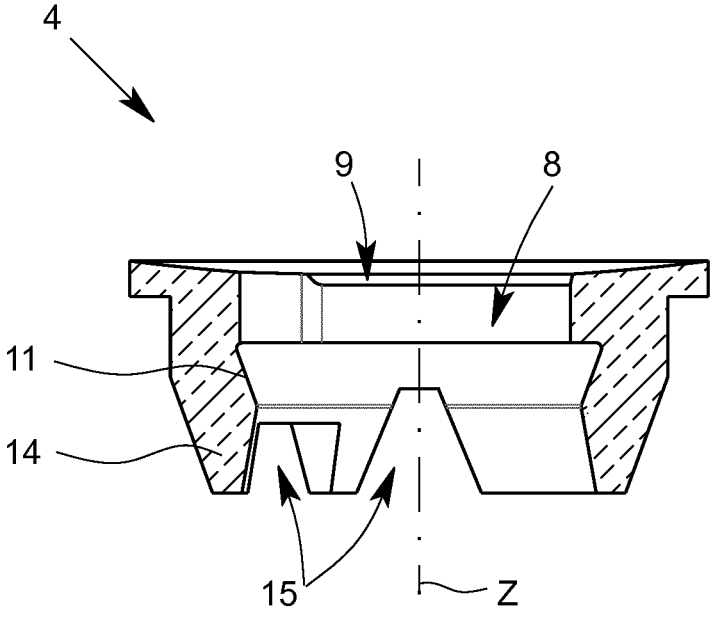
FIG. 5 is a sectional view through the bottom part of FIG. 2.

FIG. 1 diagrammatically shows a section through a preferred embodiment of a block piece 1 according to the invention for blocking a lens 2, in particular an eyeglass lens. In FIG. 1, a lens 2 is blocked on the block piece 1 by means of a block material 3. A block piece-lens pair 16 is thus depicted here.

In the embodiment that is depicted here and is preferred, the lens 2 is an eyeglass lens, i.e., a lens 2 for a pair of eyeglasses. The lens 2 consists here of plastic. Alternatively, it can consist of glass or the like. In the example, the lens 2 has a diameter of multiple centimeters, in particular of more than 3 cm.

The lens 2 has two optically active sides here, namely an already-finished block side 2A and a processing side 2B that is still to be processed. The two sides can have any shape. For example, the block side 2A and/or the processing side 2B can be convex, concave or flat. In this case, one side is considered convex or concave, respectively, when it is raised at the base, i.e., curved outward or recessed, i.e., curved inward, respectively.

Here, a protective film 17 is bonded onto the block side 2A of the lens 2.

In the embodiment that is depicted here and is preferred, a thermoplastic is used as block material 3, preferably as it is described in International Patent Application Publication WO 2011/018231 A1 and corresponding U.S. Pat. No. 9,340,669 B2. In contrast to a light-curing block material (e.g., UV glue), a thermoplastic is deformable again after its hardening, e.g., by heating. This is advantageous during so-called deblocking, i.e., the detaching of a blocked lens from the block piece. In order to make possible a deblocking of a lens that is blocked by means of light-curing block material, typically fillers are added to the light-curing material, which fillers, however, reduce its rigidity. This can lead to errors during the processing and/or coating the lens. Thus, a thermoplastic block material in a temperature range of approximately 20° C. to 30° C. typically has a higher rigidity than a light-curing block material.

The block piece 1 according to the invention has a bottom part 4 for holding the block piece 1, e.g., in a workpiece chuck of a processing device or coating device, and a separate upper part 5 for a fastening of a lens 2. Preferably, the block piece 2 is made of precisely one bottom part 4 and precisely one upper part 5.

Figure 6:
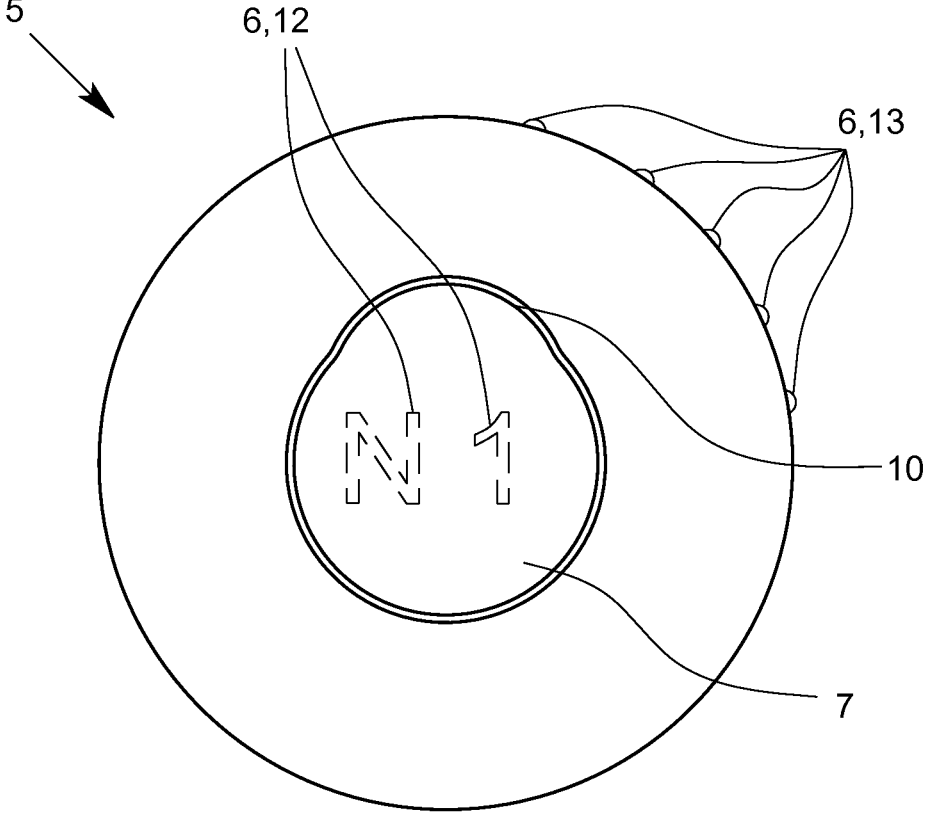
FIG. 6 is a bottom view of an upper part of the block piece of FIG. 1.

FIGS. 2 to 5 diagrammatically show various views of the bottom part 4 of the block piece 1 of FIG. 1. FIG. 6 diagrammatically shows in a bottom view the upper part 5 of the block piece 1 of FIG. 1.

The block piece 1 preferably has a clamping diameter of 43 mm, as it is defined in DIN 58766 and is indicated in FIG. 1 by the reference number S.

In the embodiment that is depicted here and is preferred, the bottom part 4 and the upper part 5 are plugged into one another in a torque-proof manner. In particular, rotations of the upper part 5 relative to the bottom part 4 cannot be performed in the peripheral direction of the upper part 5.

In the embodiment that is depicted here and is preferred, the bottom part 4 is made of metal, in particular aluminum or zinc, quite especially an aluminum alloy, and the upper part 5 is made of plastic, in particular a machinable plastic such as POM or the like. Preferably, the upper part 5 is a plastic injection-molded part.

In the embodiment that is depicted here and is preferred, the block piece 1 has at least one marking 6 or coding 6, which indicates a type of block piece 1.

In the embodiment that is depicted here and is preferred, a plug-in element 7 of the upper part 5 is plugged into a first recess 8 of the bottom part 4. The first recess 8 can, as shown in FIGS. 1 to 5, be made continuous in the axial direction and thus can form a passage.

The upper part 5 is preferably pressed into the bottom part 4, in particular in a force fit and/or an interference fit (press fit). Because of the force fit and/or the interference fit, there is no play between the bottom part 4 and the upper part 5. To this end, the plug-in element 7 has here a larger circumference than the first recess 8, in particular a circumference that is larger by approximately 0.5 mm to approximately 2 mm. Preferably, a lower edge of the plug-in element 7 is tapered. This is indicated in FIG. 6 by a second line and can serve as a plug-in and/or press-in aid.

In the embodiment that is depicted here and is preferred, the upper part 5 is positively connected to the bottom part 4 in a torque-proof manner. The positive fit is achieved here in such a way that the bottom part 4 has a second recess 9, and the upper part 5 has a pin 10 that is complementary to the second recess 9 of the bottom part 4. The second recess 9 is limited in the peripheral direction of the bottom part 4. The upper part 5 can be plugged in here only into the bottom part 4 in such a way that the pin 10 of the upper part 5 grips into the second recess 9 of the bottom part 4, in particular in an interference fit.

The second recess 9 of the bottom part 4 runs in the peripheral direction preferably in the shape of an arc. This allows a simple production, in particular considering the material of the bottom part 4, and simultaneously the achieving of a precise positive fit.

Preferably, the upper part 5 can be detached from the bottom part 4, in particular by the application of force, quite especially by extrusion, here in the axial direction.

The upper part 5 has a block surface 5A for the lens 2 and/or the block material 3.

Figure 7:
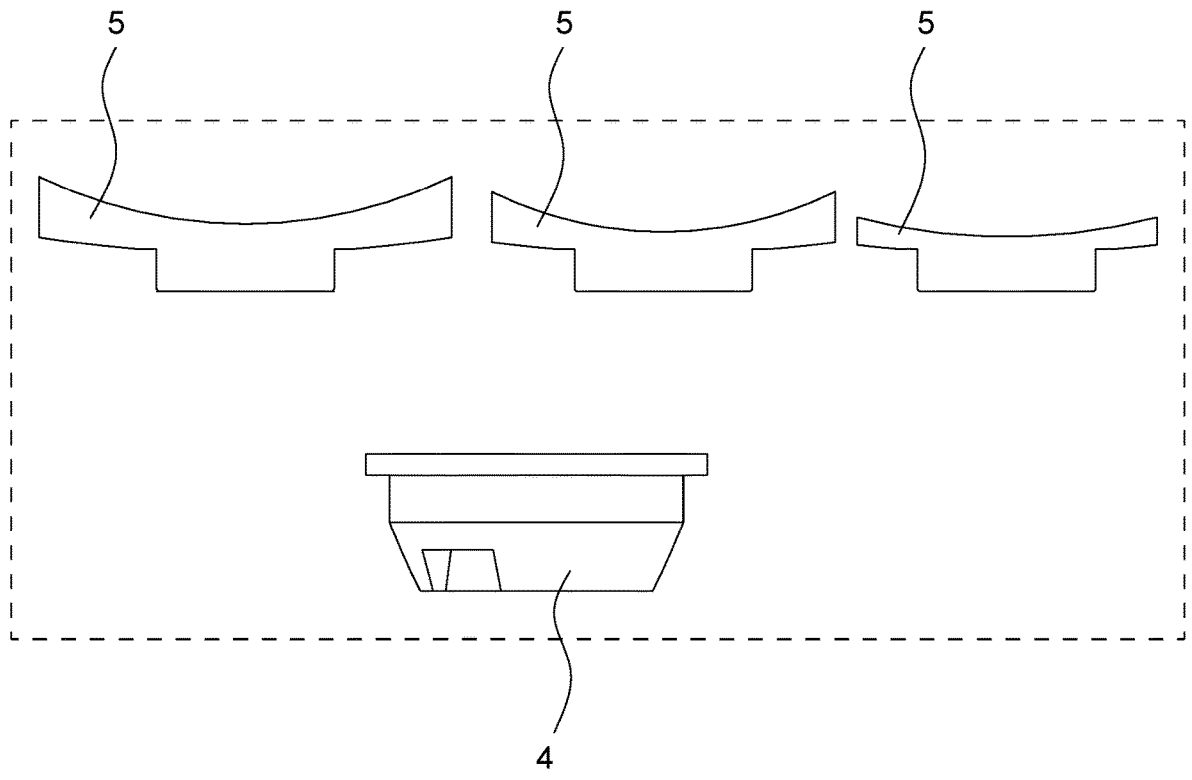
FIG. 7 is a schematic view of multiple upper parts.

In the embodiment that is depicted here and is preferred, the bottom part 4 can be connected in particular in succession with various upper parts 5 as shown in FIG. 7. The upper parts 5 are exchangeable. The upper parts 5 are different relative to the diameter of the block surface 5A, the curvature of the block surface 5A, and/or the prismatic tilting of the block surface 5A.

A prismatic tilting of the block surface 5A is to be defined here so that the normal at the midpoint of the block surface 5A of the respective upper part 5 relative to a central axis Z of the bottom part 4 is inclined. This makes possible a prismatic blocking. It can be provided that each upper part 5 can be plugged into the bottom part 4 only in such a way that the normal at the midpoint of the block surface 5A of the respective upper part 5 and the central axis Z of the bottom part 4 always span the same plane.

In the embodiment that is depicted here and is preferred, the block piece 1, namely the bottom part 4, has an undercut 11 for positive axial holding and/or clamping of the block piece 1. For example, internal grippers can grip into the undercut 11 of the bottom part 4 and thus set the block piece 1 in a seat. The undercut 11 is preferably designed to run circumferentially around an inner circumference of the bottom part 4. The undercut 11 preferably expands in the radial direction viewed from the bottom side of the bottom part 4 toward the plugged-in upper part 5 (i.e., from bottom to top in FIG. 1).

The marking 6 and/or coding 6 is designed so that the type of block piece 1, in particular the upper part 5, can be identified manually and/or automatically. The type identifies, e.g., a purpose, a state, and/or a property of the block piece 1, such as, e.g., the diameter of the block surface 5A, the curvature of the block surface 5A, the prismatic tilting of the block surface 5A, and/or a degree of wear of the upper part 5.

The marking 6 and/or coding 6 of the block piece can be provided on the bottom part 4 and/or on the upper part 5, in particular on the periphery of the upper part 5 and/or on a bottom side of the plug-in element 7 of the upper part 5. The marking 6 and/or coding 6 can be a characteristic, for example at least one number and/or at least one letter. The marking 6 and/or coding 6 can also be at least one protrusion and/or at least one recess.

Exemplary markings 6 are depicted in FIG. 6. Here, a characteristic 12 is provided on a bottom side of the plug-in element 7 of the upper part 5. This characteristic 12 remains permanently on the block piece 1. In addition, five protrusions 13 are arranged on the periphery of the upper part 5. The protrusions 13 consist of the same material as the upper part 5. Preferably, they are attached to the upper part 5 during the injection molding of the upper part 5. The protrusions 13 can be machined in the case of processing of the lens 2. Even if the protrusions 13 are partially or completely machined, the type of upper part 5 remains identifiable based on the characteristic 12.

The material removal of the protrusions 13 serves as an indicator for the degree of wear of the upper part 5. The material removal of the protrusions 13 can be detected, e.g., by means of a camera. It can thus be determined whether an upper part 5 is to be exchanged or not before an (additional) blocking process.

Advantageously, the bottom part 4 and/or the upper part 5 on the periphery has a groove for holding a blocked lens 2 and/or a block piece-lens pair 16 on the bottom part 4 and/or upper part 5 by means of a transport device.

In the embodiment that is depicted here and is preferred, the bottom part 4 has three recesses 15 in a wall 14. Two of the three recesses 15 have a V-like shape and can be connected by an axis that runs perpendicular to the central axis Z. These two recesses 15 make it possible to place the block piece 1 on a support in two rotational positions of the block piece 1 around the central axis Z. The third of the three recesses 15 has an essentially rectangular shape and is offset to the two other recesses 15 in the peripheral direction of the bottom part 4. It limits the placing of the block piece 1 to precisely one rotational position of the block piece 1 around the central axis Z.

The block piece according to the invention can now be used so that the lens 2 is optionally blocked a) on the upper part 5 that is plugged into the bottom part 4 in a torque-proof manner by means of an adhesive block material 3 (e.g., a thermoplastic or a light-curing block material) or b) on the bottom part 4 by means of a metal alloy as block material 3, or c) on an adapter that is attached to the bottom part 4 by means of a metal alloy as block material 3.

This makes possible a flexible and diverse use of the bottom part 4.

In the case of the alternative a), a suitable upper part 5 can be selected and connected in a detachable manner to the bottom part 4 depending on requirements during blocking and/or processing and/or coating of the lens 2. Thus, e.g., an upper part 5 can be selected, whose block surface 5A corresponds as precisely as possible to the block side 2A of the lens 2.

Preferably, for the alternative b), the first recess 8 of the bottom part 4 in axial direction is not continuous but terminated.

The adapter that can be applied for the alternative c) on the bottom part 4 preferably forms a seat for the metal alloy as block material 3.

What is claimed is:

1. A block piece for blocking an eyeglass lens by means of a block material, comprising:

a bottom part comprising a holding section, the holding section being adapted for detachably connecting the block piece with a workpiece chuck of a processing device or a coating device, wherein the holding section is formed by an annular wall surrounding a central, axially open recess, and an upper part for fastening of the lens for processing and/or coating an optically active surface of the lens, wherein only the upper part has a block surface for at least one of the lens or the block material, and wherein said upper part has the block surface for the lens or the block material, wherein a normal at a midpoint of the block surface of the upper part is inclined relative to a central axis of the bottom part, and wherein the upper part is insertable into the bottom part only in one orientation in such a way that the normal at the midpoint of the block surface of the upper part and the central axis of the bottom part always span a same plane.

2. The block piece according to claim 1, wherein the bottom part and the upper part are connected to one another in a torque-proof manner, wherein said torque-proof manner is achieved by the upper part being connected to the bottom part with at least one of an axial or radial interengagement between the upper and bottom parts.

3. The block piece according to claim 1, wherein the holding section of the bottom part has a second recess that is limited in a peripheral direction of the bottom part, and wherein the upper part has a pin that is complementary to the second recess so that, with the upper part plugged into the bottom part, the pin of the upper part grips into the second recess of the bottom part in a press fit in a torque-proof manner that prevents rotation of the upper part relative to the bottom part in a circumferential direction.

4. The block piece according to claim 1, wherein the annular wall of the bottom part has an undercut for positive axial holding and/or clamping the block piece in the workpiece chuck of the processing device or the coating device.

5. The block piece according to claim 1, wherein the upper part is a plastic injection-molded part.

6. The block piece according to claim 1, wherein the bottom part is connectable to various upper parts that are different with respect to at least one of a diameter of the block surface, a curvature of the block surface, or a prismatic tilting of the block surface.

7. The block piece according to claim 1, wherein the block piece has at least one marking or coding, which indicates a type of block piece.

8. The block piece according to claim 7, wherein the at least one marking or coding comprises at least one protrusion and/or wherein the at least one marking or coding is provided on a periphery of the upper part.

9. The block piece according to claim 7, wherein the at least one marking or coding is a permanent part of the block piece, and/or wherein the at least one marking or coding is machinable during processing of the lens.

10. The block piece according to claim 7, wherein the block piece has two markings or codings, one marking or coding being arranged so that it remains permanently on the block piece, and the other marking or coding is arranged so that it is machined during processing of the lens.

11. The block piece according to claim 1, wherein the bottom part has recesses in the annular wall for holding the block piece on a support.

12. The block piece according to claim 11, wherein the bottom part has three recesses in the annular wall so that a placing of the block piece is limited to precisely one rotational position of the block piece.

13. The block piece according to claim 1, wherein the recess forms a passage extending completely through the bottom part.

14. The block piece according to claim 1, wherein the bottom part and the upper part are connected to one another in a torque-proof manner with respect to one another by a press fit so that rotation of the upper part relative to the bottom part cannot be performed in a circumferential direction.

15. A kit comprising:

a bottom part having a holding section formed by an annular wall surrounding a central, axially open recess for holding a block piece in a workpiece chuck of a processing device or a coating device and multiple upper parts for blocking an eyeglass lens by means of a block material, wherein only the upper parts have a block surface for at least one of the lens or the block material, the upper parts are different with respect to at least one of a diameter of the block surface, a curvature of the block surface, or a prismatic tilting of the block surface, the holding section of the bottom part is selectively connectable with any one of the upper parts by a press fit, the block piece formed by the bottom part and one of the upper parts is adapted to be held on the bottom part for at least one of processing or coating of an optically active surface of the lens, and a normal at a midpoint of the block surface of the upper parts is inclined relative to a central axis of the bottom part, and wherein the respective upper part is insertable into the bottom part only in one orientation in such a way that the normal at the midpoint of the block surface of the respective upper part and the central axis of the bottom part always span a same plane.

16. A method for blocking an eyeglass lens, wherein a block piece is provided which has a bottom part, the bottom part having a holding section formed by an annular wall surrounding a central, axially open recess with which the block piece can be held in a workpiece chuck of a processing device or a coating device, and an upper part for a fastening of the lens for at least one of processing or coating of an optically active surface of the lens, and wherein only the upper part has a block surface for at least one of the lens or a block material, wherein said upper part has the block surface for the lens or the block material, wherein a normal at a midpoint of the block surface of the upper part is inclined relative to a central axis of the bottom part, and wherein the upper part is insertable into the bottom part only in one orientation in such a way that the normal at the midpoint of the block surface of the upper part and the central axis of the bottom part always span a same plane, the method comprising:

connecting the holding section of the bottom part with the upper part by a press fit, blocking the lens on the upper part by means of the block material, at least one of processing or coating the optically active surface of the blocked lens, and at least one of the following features:

using the bottom part made of metal and the upper part made of plastic for said blocking of the lens on the upper part, or connecting the top and bottom parts in such a way that the normal at the midpoint of the block surface of the upper part and the central axis of the bottom part always span the same plane.

17. The method according to claim 16, comprising the further step of selecting the upper part from among multiple different upper parts in such a way that a block surface of the selected upper part corresponds as precisely as possible to a block side of the lens.

18. The method according to claim 16, wherein a thermoplastic or a light-curing adhesive is used as the block material.

19. The method according to claim 16, wherein the upper part is detached from the bottom part by application of force.

20. The method according to claim 19, wherein the bottom part and the upper part being connected to one another in a torque-proof manner, wherein additional upper parts are provided, wherein the upper parts are different with respect to at least one of a diameter of the block surface of the upper part, a curvature of the block surface or a prismatic tilting of the block surface, and wherein the different upper parts are used for blocking of lenses with corresponding different properties.

21. The method according to claim 16, wherein the method further comprises connecting the top and bottom parts in a torque-proof manner that prevents rotation of the upper part relative to the bottom part in a circumferential direction.

22. A block piece for blocking an eyeglass lens by means of a block material, comprising:

a bottom part comprising a holding section, the holding section being adapted for detachably connecting the block piece with a workpiece chuck of a processing device or a coating device, wherein the holding section is formed by an annular wall surrounding a central, axially open recess, and an upper part for fastening of the lens for processing and/or coating an optically active surface of the lens, wherein only the upper part has a block surface for at least one of the lens or the block material, wherein the bottom part has a connecting recess for receiving the upper part, with a periphery of the connecting recess, when viewed in a top view of the bottom part along a central axis of the bottom part, having a rotational asymmetrical shape, wherein the upper part comprises a connecting portion that has a rotationally asymmetrical shape complementary to the rotational asymmetrical shape of the connecting recess, and wherein the connecting portion is or can be plugged into the connecting recess so that the bottom part and the upper part are fixedly connected to one another in a torque-proof manner that prevents rotation of the upper part relative to the bottom part in a circumferential direction and in a defined rotational position determined by the rotational asymmetry, and wherein the connecting recess and the connecting portion are non-circular, and wherein a normal at a midpoint of the block surface of the upper part is inclined relative to the central axis of the bottom part.

23. The block piece according to claim 22, wherein the connecting recess has the rotational asymmetry with respect to the central axis of the bottom part extending centrally through the central axially open recess.

24. The block piece according to claim 22, wherein the bottom part and the upper part are connected to one another by a press fit.

25. The block piece according to claim 22, wherein the block piece is configured for blocking by producing an exclusively bonded connection between the lens and the block piece by means of the block material, so that a block piece-lens pair with precisely one lens and precisely one block piece results from this blocking, wherein the resulting block piece-lens pair is configured for being held in the processing device or the coating device for processing and/or coating a back or front surface of the lens.

* * * * *